UNITED STATES PATENT OFFICE.

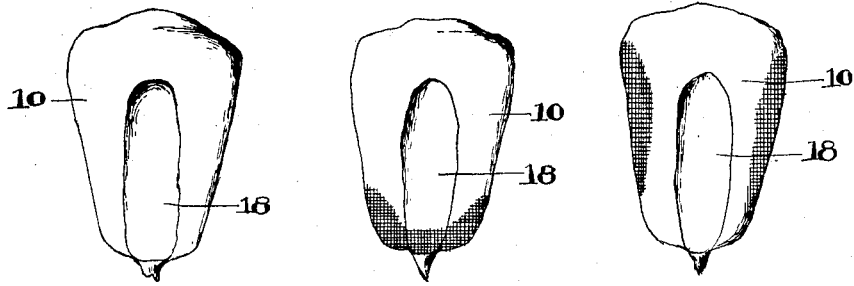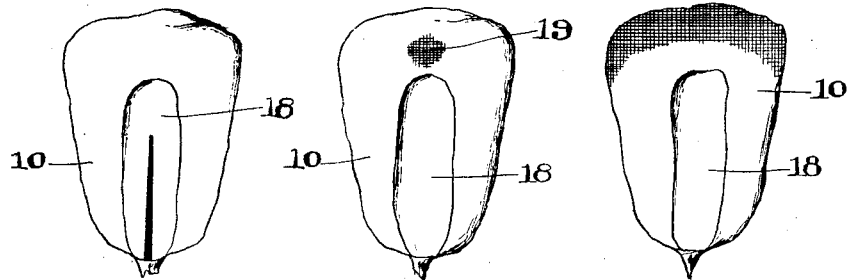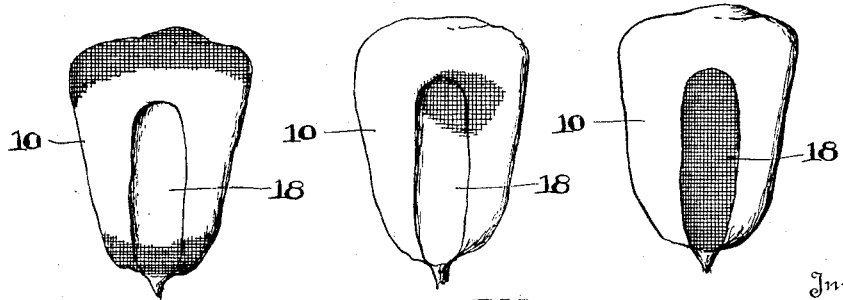

ALFONSO C. GALLARDO, OF WASHINGTON, DISTRICT OF COLUMBIA.

METHOD OR PROCESS FOR DETERMINING THE GERMINATING VALUE OF SEED.

1,330,112. Specification of Letters Patent. Patented Feb. 10, 1920.

Original application filed April 19, 1918, Serial No. 229,627. Divided and this application filed May 20, 1918. Serial No. 235,544.

*To all whom it may concern:*

Be it known that I, ALFONSO CUESTA GALLARDO, a citizen of Mexico, and a resident of Washington, in the District of Columbia, have invented certain new and useful Improvements in Methods or Processes for Determining the Germinating Value of Seed, of which the following is a specification.

The present invention relates to the testing of seed to determine the germinative value thereof, and has for an object to provide a method or process which may be conveniently practised for ascertaining in a relatively short period of time the condition of seed for growing.

The present application is a division of application Serial No. 229,627 filed April 19, 1918, for a method and apparatus for determining the germinating value of seed.

The value of tests is widely recognized, and is strongly indorsed by the United States Department of Agriculture which has issued several publications on germination of seed among which might be mentioned a special Farmers' Bulletin No. 253 dealing solely with the germination of seed corn. The bulletin describes in detail the value of these tests and also sets forth what has heretofore been known as the simplest method of conducting the tests. It will be noted particularly that the tests require on an average of five days for determining by actual growth the germinative values of the selected seed.

Considerable objection has been raised by farmers against this present known method, and the tests are generally ignored on account of the time necessary to carry out the tests, the cost of apparatus often employed, and the space required for conducting the tests and for maintaining the grown bulk in proper and segregated condition during the germination of the selected seed.

One of the principal objects of the present invention is to provide a method by which the germinative values of the seed may be determined in a few minutes, and by the use of simple utensils or economical apparatus available in even remote rural sections of the country. The present process eliminates the necessity for the extreme care and attention required in the actual germination of the seed.

It is well known that seed is useless or becomes defective under various conditions, chiefly among which may be mentioned the immaturity of the seed in whole or in part; humidity which disorganizes cells of the seed; fermentation in whole or in part either while the grain is drying on the plant or after stored under unfavorable conditions; the action of frost; and rancid condition resulting from storing for a considerable length of time. These defects very seldom can be determined by the naked eye, or by supposed quick tests, such as splitting the seed and the like. These defects decrease, or entirely destroy the germinative power of the seed, and account for the weak growth of many of the plants in the field.

The present novel method or process is based upon certain actions and re-actions which take place in the seed when subjected to various chemical solutions or electrolytic process or other means for quickly detecting the decomposition of defective parts of the seed and for acting to a considerable lesser degree upon the sound portions of the seed. The decomposed portions of the seed are discolored by re-action to a greater extent than are the unsound portions of the seed, and hence any defective parts of the seed are developed or accentuated to the eye by the relatively dark or light discoloration of the seed.

While the method or process of this invention may be carried out for the determining of the germinative values of various seeds, the following disclosure of the invention will deal by way of example, with the treatment of white Indian seed corn.

In the accompanying drawings:

Figures 1 to 9 are enlarged views in elevation of corn seed, showing various defects in the seed brought out by the darkened portions illustrated according to the present method and as compared with the perfect corn seed shown in Fig. 1.

In the practice of the present method or process a certain number of seed is selected from each ear of corn to be tested, usually six seed in number from different portions of the ear in a manner recommended in the aforesaid Bulletin No. 253 of the Department of Agriculture. These selected seeds may be treated independently or simultaneously in segregated batches or groups, in which latter event, suitable apparatus may be employed, such as is disclosed in the parent application hereinbefore referred to.

It is of course understood that the ears of corn, from which seed has been removed for testing, are placed in a predetermined place, preferably on a numbered rack so as to be able to identify the untreated seed with that being treated of any particular ear of corn, both before and after the test has been completed. Where seed other than that provided by nature with a suitable carrier, such as the cob of corn, is to be tested, a batch of seed, say from a single cantaloup, is dried and maintained in a single batch until after the test, a few of the seed of the batch being tested to determine the germination value of the said batch. The approximate germinative value of a mixed batch, such as is sold at seed dealers, may be determined by selecting a number of seed from the mixed batch, but it is far better to follow out the procedure of maintaining the batches separate as above described in order to get the best results.

According to the present method or process, the selected seeds to be tested are subjected to the action of a re-agent, or any substance which, by reason of its capacity for taking part in certain re-actions, is used in detecting, examining or measuring the qualities of the seed tested.

While various chemicals may be used for developing or re-acting upon the seed, for the purpose of this description, reference will be had only to an easily and economically obtained substance for effecting the action and re-action. This substance, which may be obtained in all parts of the world, is lime, frequently found as calcium carbonate, $CaCO_3$, and is most commonly placed upon the market as burnt lime. For using the burnt lime in this method, the lime is slaked, such as by adding one part of water and three parts of the lime, producing calcium hydroxid, $CaH_2O_2$.

The calcium hydroxid, which is produced in a fine white powder or flour of lime, is mixed to the proportion of five per cent. with water or with any other practical proportion, to obtain the required strength of lime solution for effecting the re-action in the grain. It is preferred to heat the water or solution say to a boiling point, before the introduction of the seed thereto, which will augment the process, and provide for development in a minute and a half more or less according to the temperature of the solution.

This solution is placed in a suitable receptacle such as a pan or tray, and the seed to be tested is immersed in the solution, and the re-action or development of the seed may be observed when the quantity of the solution is such as to only completely cover the immersed seed, or when the seeds are brought sufficiently near the surface level of the solution to be seen. The seed to be tested may be merely dropped into the receptacle and may be raised from time to time to the surface level of the solution upon a ladle, common spoon, or other suitable implement, by means of which the seed may be readily handled in examining the seed and removing the same from the receptacle. Any suitable apparatus may be employed for the purpose of handling and supporting the seeds in the receptacle, such as the carrier set forth in the parent application above referred to.

When the grain is subjected to the action of the lime, the lime first attacks the skin of the grain and discolors it; in the case of white corn turning the skin a light yellow. Where the grain has become decomposed, or its feeding cells disorganized by the action of moisture or otherwise injured, the skin opposite such portions of the grain is affected by the lime to a greater extent and is changed to a relatively dark yellowish brown color. This action takes place within from one to five minutes or more when the water in the tray is boiling, and a little care must be exercised in not over-developing the grain for the desired contrast in colors of the sound and unsound portions of the grain is reduced. While the solution, in such a short time, is not permitted to wholly disintegrate and remove the skin of the grain, it is found by actual experiment that the skin is so affected opposite the unsound portions of the grain, by such unsound portions, that the lime changes these portions of the skin to a darker color than the portions of the skin which are opposite the sound parts of the grain. By reason of this fact, the method may be conducted within a few minutes' time, although if desired the grain may be subjected to the solution for fifteen minutes or more in order to fully disintegrate and remove the skin and allow the solution to attack the vital nucleus and starch and gluten components of the grain. Under such conditions, the body of the grain is affected similarly to that of the skin, in other words the unsound portions of the grain are turned to a different color than are the sound portions.

Should any of the seed float to the surface of the solution, after having been well soaked, it is evidence of lack of density which indicates that the seed of the particular ear of corn or batch of seed related to it should not be used as seed.

It is well known that a visual examination of grain before the test does not disclose the quality of the grain, except in some very accentuated instances, and therefore the great advantage and desirability of the present method may be appreciated for the only positive known means of determining the values of grain heretofore has been by germination of the grain, a long and tedious as well as expensive method, as above explained.

It is to be distinctly understood that this method is not limited to the use of lime as a re-agent, reference to it being merely by way of example and because it may be readily obtained in any civilized parts of the world and is inexpensive. Neither is the method limited to the use of an alkali, in the solution as a re-agent. Various fluid re-agents, too numerous to mention, may be used which attack the inferior parts or portions of the seed differently than the sound parts or portions of the seed. Decomposition may be augmented by electrolyses which will be found very useful where very large quantities of seed are to be tested and where speed is of great importance.

Should the seed be sound and possess substantially perfect germinative value, when the seed is subjected to the solution of re-agent, it should have the appearance indicated in Fig. 1 of the accompanying drawing, or should be of uniform color over its exterior surface.

As illustrating the action and re-action of the substance upon the grain to show the defective or unsound parts thereof as compared with the perfect grain illustrated in Fig. 1, reference is had to Figs. 2 to 9, inclusive. In Fig. 2 the tip or inner end of the grain is unsound as is shown by the contrasting discoloration of the grain by reaction. In Fig. 3 the edges of the grain are unsound as shown by the relatively deep discoloration. In the latter case, the surrounding starchy substance is partly deteriorated and consequently if this seed be planted, the embryo will lack the full nourishment required so essential at the start of development of the plant. In the former instance, shown in Fig. 2, the inner end, or what is commonly termed the "heart" of the corn is affected and experiments show that the germination of such seed results in a weak root growth.

In Fig. 4 is shown the discoloration of the heart 18 of the seed, showing that the seed possesses no germinative value and is dead. In Fig. 5 is shown a grain which is sound in the parts but which has developed a dark spot 19 near the top or outer end of the grain, showing a slight decomposition in the body or nourishing portion of the seed. This spot may occur in any other part of the grain, and though it will germinate, experience shows that no grain should be planted even if it shows the slightest trace of decomposition.

Fig. 6 shows the entire outer end or top of the seed affected by contact, as a rule with moisture. Fig. 7 shows the top and bottom of the seed affected. Fig. 8 shows a slight decomposition in the heart of the grain which is indicative of weak branch and upper stalk growth. Fig. 9 shows the manner in which a grain is affected when the heart thereof is entirely dead, as contra-distinguished from the showing in Fig. 4, which latter indication shows that the grain has been affected by frost.

There appear other seeds that do not show any spot, such as illustrated in Fig. 1, and such spotless grains are from sound ears or batches which comprise the strong germinating seeds and are the only ones that should be planted. More marked contrasts in discoloration is obtained when the seeds are treated in groups of say six to ten seeds from the same ear of corn, than when distinguishing a group of mixed seeds from a batch of mixed corn.

This discoloration of the seed by this process remains practically fixed or readily discernible for a very great length of time. Therefore the discolored seed may be maintained as examples of inferior seed to stimulate care in raising, protecting, drying and storing of seed. The discolored seed in framed condition may be used at exhibitions, in conjunction with text, lectures, etc., to make known the various agents which have a deteriorating effect on the seed and point out the remedy.

The process may be likened to the development of a photographic negative in that the seed with little or no visual evidence of immaturity, it having been exposed to deteriorating agents; or death by age, may be acted upon by a re-agent to develop such defects to be readily discernible by comparison just as lack of exposure under proper conditions, or lack of life so to speak, of the sensitized coating of the photographic plate due to age, is readily perceived by subjecting it to a re-agent, such as the developing fluid.

Before planting the entire batch of seed, selected as a result of the first test, a second selection may be carried out with advantage of allowing the whole quantity of seed to soak say for ten hours in a tepid warm solution of lime, followed by removal of the seed from the solution and picking out of those seeds which are defective or show a marked discoloration in any part of the grain. The dead embryo of the spoiled seeds may be easily detected after soaking in this way, appearing as they do and illustrated in the drawings. The separation of the spoiled seed from that which is good for planting, may be carried out either by hand or by the use of a suction device similar to the number of vacuum cleaners, the device provided with a nozzle having an opening according to the size of grain tested. Wood ashes in any quantity and a small portion of copper sulfate, say in the proportion of one to five thousand solution may be used to advantage in combination with the lime, if desired. The ashes will stimulate the germination and the copper sulfate will thoroughly disinfect the seed from fungus germs, etc. A more even, strong and quicker germination may be obtained by carrying out this second selection of the pre-soaked seed, it being understood that the seed is planted directly after the second selection and before it becomes dry.

I claim:

1. That method of determining the value of seed, comprising subjecting selected seed to a re-agent which changes the color of the seed differently as to its constituents.

2. The method of determining the value of seed which comprises subjecting the seed to the action of a re-agent which causes a contrasting difference in color between the fit or sound portions and the unfit or unsound portions of the seed.

3. The method of determining the value of seed comprising subjecting the seed to the action of an alkaline solution which causes a contrasting difference in color, between the fit or sound portions, and the unfit or unsound portions of the seed.

4. The method of determining the value of seed comprising subjecting the seed to the action of a lime solution which distinguishes the fit or sound from the unfit or unsound portion of the seed by a contrast of colors.

ALFONSO C. GALLARDO.